US009355101B2

(12) United States Patent
Waites

(10) Patent No.: US 9,355,101 B2
(45) Date of Patent: May 31, 2016

(54) BOOT IN A MEDIA PLAYER WITH EXTERNAL MEMORY

(75) Inventor: Nigel Waites, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 2505 days.

(21) Appl. No.: 12/075,921

(22) Filed: Mar. 14, 2008

(65) Prior Publication Data

US 2008/0229016 A1    Sep. 18, 2008

Related U.S. Application Data

(60) Provisional application No. 60/918,419, filed on Mar. 16, 2007.

(51) Int. Cl.
*G06F 3/00* (2006.01)
*G06F 17/30* (2006.01)
*G11B 27/11* (2006.01)
*G11B 27/32* (2006.01)

(52) U.S. Cl.
CPC .......... *G06F 17/30038* (2013.01); *G11B 27/11* (2013.01); *G11B 27/322* (2013.01)

(58) Field of Classification Search
CPC . G06F 17/30038; G11B 27/322; G11B 27/11
See application file for complete search history.

(56) References Cited

U.S. PATENT DOCUMENTS

| | | | | |
|---|---|---|---|---|
| 5,355,302 A * | 10/1994 | Martin et al. | ................. | 700/234 |
| 6,760,721 B1 * | 7/2004 | Chasen et al. | | |
| 7,136,874 B2 * | 11/2006 | Mercer et al. | ................. | 707/693 |
| 7,227,971 B2 * | 6/2007 | Nagao | ........................... | 382/100 |
| 7,451,152 B2 * | 11/2008 | Kraft et al. | | |
| 7,593,782 B2 * | 9/2009 | Jobs et al. | ....................... | 700/94 |
| 7,647,297 B2 * | 1/2010 | LaChapelle et al. | ... | 707/999.002 |
| 7,668,842 B2 * | 2/2010 | LaChapelle et al. | ....... | 707/999.1 |
| 2002/0056118 A1 * | 5/2002 | Hunter et al. | ................... | 725/87 |
| 2002/0073220 A1 * | 6/2002 | Lee | .............. | 709/231 |
| 2002/0146234 A1 * | 10/2002 | Mizuno | .......................... | 386/46 |
| 2002/0147728 A1 * | 10/2002 | Goodman et al. | ......... | 707/104.1 |
| 2002/0180803 A1 * | 12/2002 | Kaplan et al. | ................. | 345/810 |
| 2004/0039648 A1 * | 2/2004 | Candelore et al. | .............. | 705/26 |
| 2004/0128308 A1 * | 7/2004 | Obrador | ........................ | 707/102 |
| 2004/0220791 A1 * | 11/2004 | Lamkin et al. | ................... | 703/11 |
| 2006/0026634 A1 * | 2/2006 | LaChapelle et al. | ............ | 725/34 |
| 2006/0114862 A1 * | 6/2006 | Hiraoka | ........................ | 370/337 |
| 2006/0161635 A1 | 7/2006 | Lamkin et al. | | |
| 2007/0033225 A1 * | 2/2007 | Davis | ........................ | 707/104.1 |
| 2007/0038647 A1 * | 2/2007 | Thomas et al. | ............... | 707/100 |
| 2008/0109911 A1 * | 5/2008 | Tedesco et al. | .................. | 726/30 |

OTHER PUBLICATIONS

International Search Report.

* cited by examiner

*Primary Examiner* — Jing-Yih Shyu
(74) *Attorney, Agent, or Firm* — Beck Tysver Evans, PLLC

(57) ABSTRACT

A media player is presented that scans the media files stored on an external memory card in order to update the internal database of the player. Media manager software on a personal computer sets a dirty bit in the internal memory of the media player whenever the media files on the external memory card are altered. The media player checks the dirty bit on start up or when the memory card is inserted. If the dirty bit is set, the media player scans the media files on the memory card, updates its database, then clears the dirty bit. If the dirty bit is not set, the media player does not scan the memory card. The dirty bit is associated in the internal memory with an identifier for the memory card, allowing the use of multiple memory cards.

19 Claims, 3 Drawing Sheets

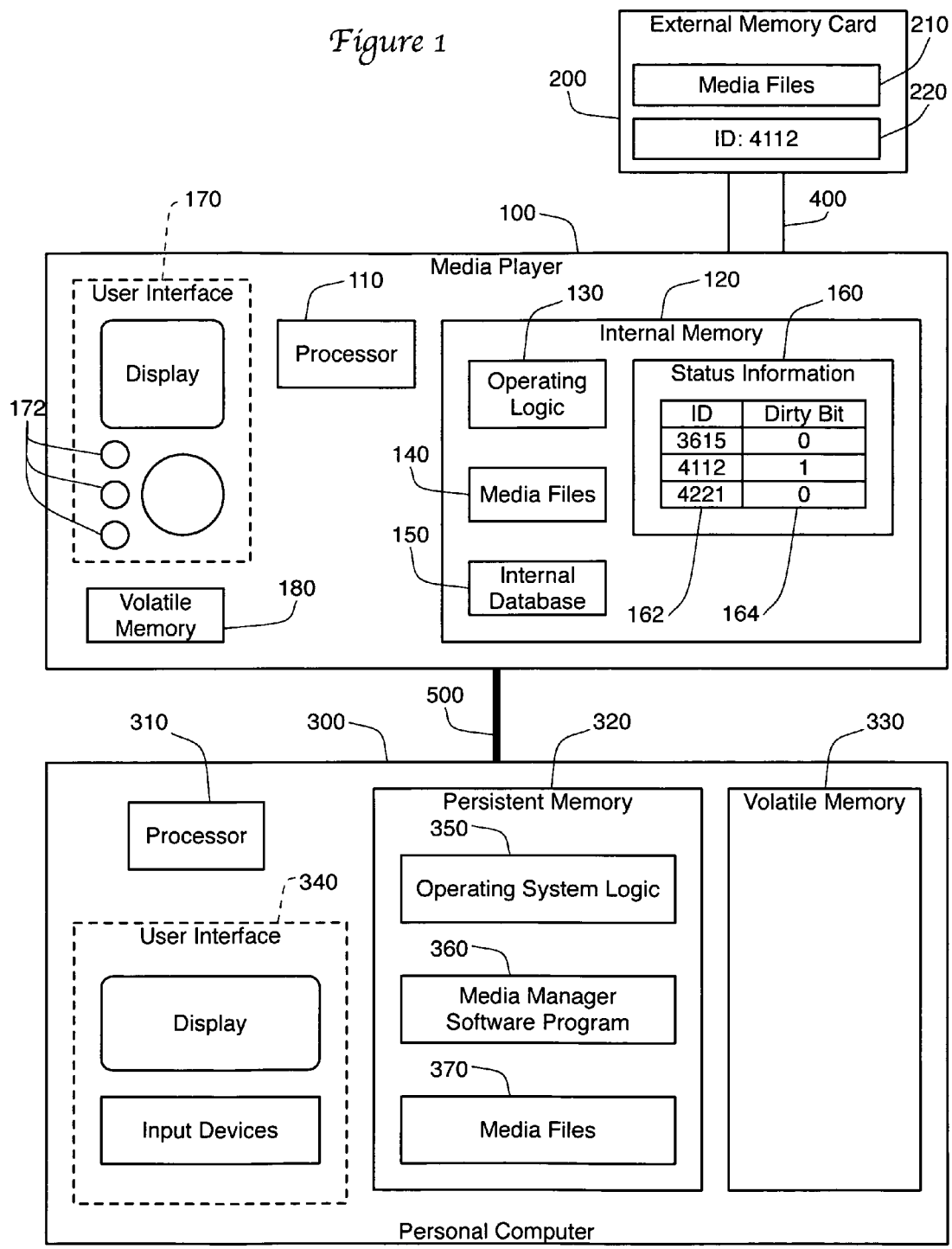

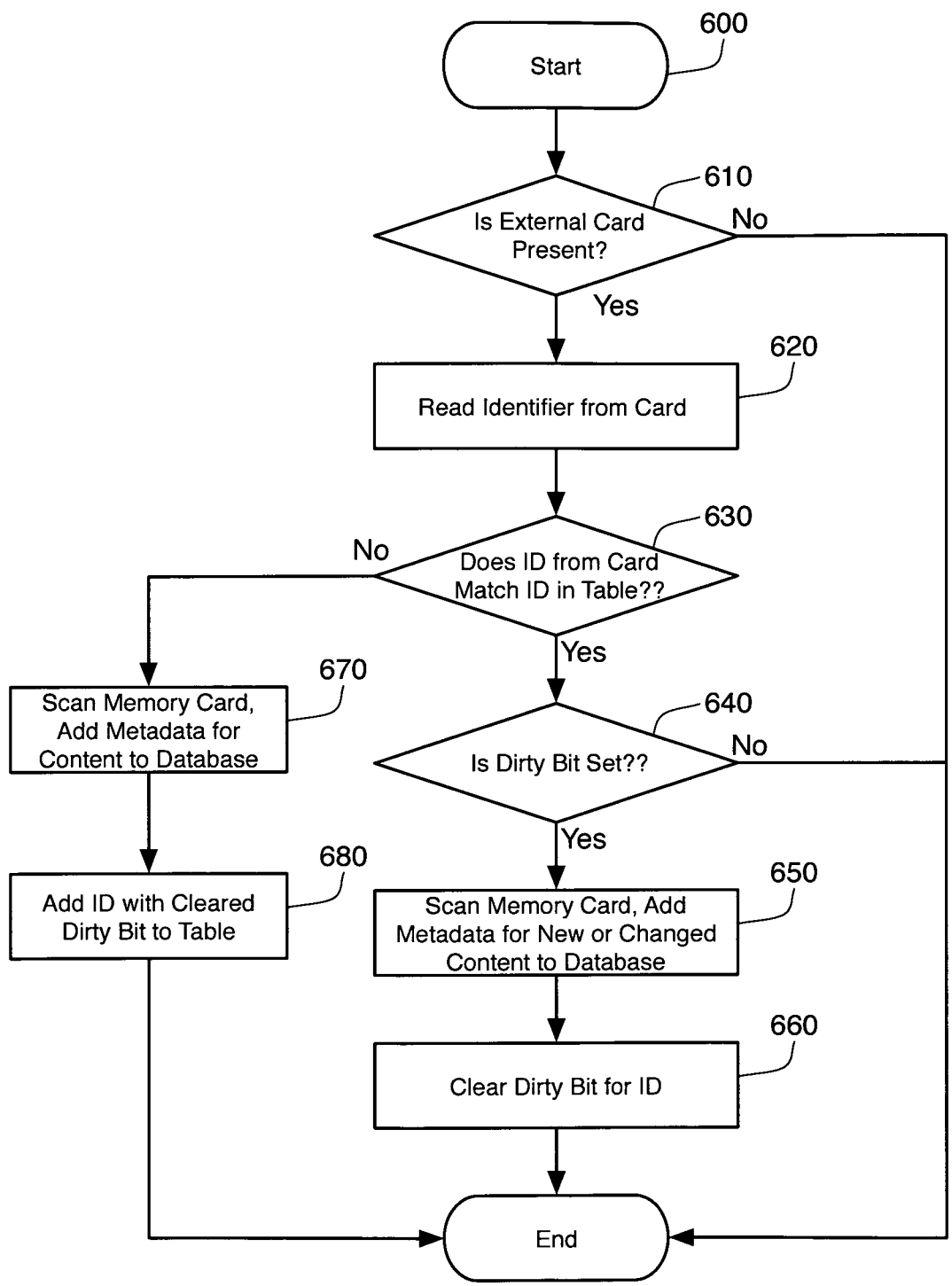

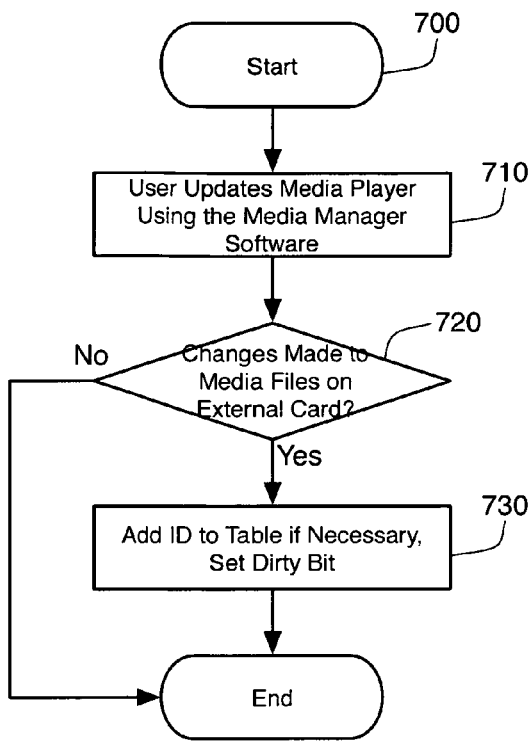
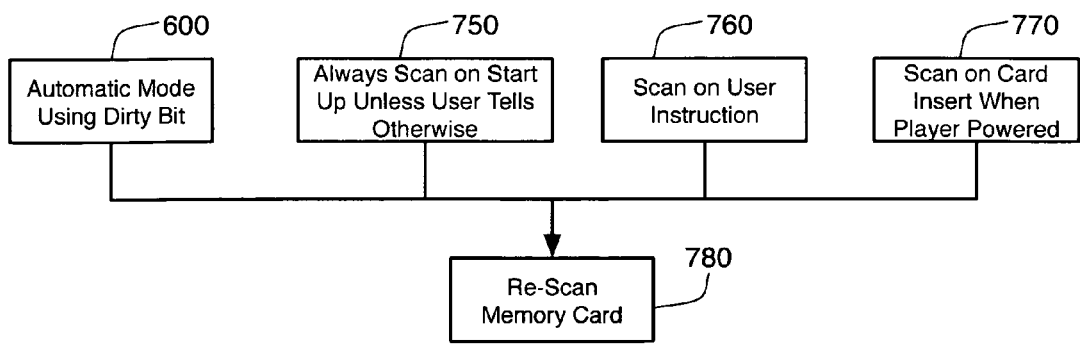

BOOT IN A MEDIA PLAYER WITH EXTERNAL MEMORY

CROSS REFERENCE TO RELATED APPLICATION

The present invention claims the benefit of U.S. Provisional Application No. 60/918,419, filed Mar. 16, 2007.

FIELD OF THE INVENTION

This application relates to the field of portable media players. In particular, the present invention improves the boot performance of media players that use external memory cards to store media files.

BACKGROUND OF THE INVENTION

Portable media players are designed to play media files that are stored on either a hard disk drive or flash memory (a non-volatile solid-state memory) found within the case of portable media player. For many users, this internal memory is sufficient to provide the media player with enough media content to meet their needs. Some media players also have an expansion slot that allows certain types of external flash memory to be attached for the storage of additional media files. For instance, a player may have a microSD slot that allows flash memory cards using the microSD format to attach to the media player. This external memory is used to expand the amount of memory usable by the player, thereby allowing users to store additional media files on their media player.

Media files are typically stored on the internal and external memory of the media player using the same type of file system used in personal computers, such as the FAT32 file system by Microsoft Corporation or HFS Plus by Apple Inc. To make accessing these files easier, most media players provide a visual user interface that allows users to browse through and select their desired files. In some cases, the player simply allows users to traverse the files using the file system hierarchy in which they are stored. Other players establish a database that allows users to use metadata relating to the media files to organize and access their media files. For instance, songs may be organized according to genre, artist, title, album, or user ranking. The metadata is added to an internal database that the media player utilizes to assist in user selection and organization of the media files.

Much of the metadata used to create the internal database is stored in the media files themselves. To populate the database, the music files stored on the media player are scanned and the metadata within the file is added to the media player internal database. With some players, this scanning occurs only when the media player is connected to a personal computer. Software on the personal computer is responsible for maintaining the content of the media files on the media player. The personal computer software creates the media player internal database during the synchronization process that takes place when the media player is connected to the personal computer. In these environments, the media player will only play media files that have been added to the memory of the media player by the personal computer software. Consequently, the media player never needs to create or update its internal database—it can rely entirely on the database created by the personal computer software.

Other media players are more flexible as to how the media files can be loaded on to the media player's memory. Consequently, they cannot rely purely on the database created by the personal computer software. Instead, the media player creates the internal database by scanning the media files using the file system of the storage media.

SUMMARY OF THE INVENTION

A media player is presented that scans the media files stored on an external memory card in order to update the internal database of the player. In one mode of operation, media manager software on a personal computer sets a dirty bit or flag value in the internal memory of the media player whenever the media files on the external memory card are altered. The media player checks the dirty bit on startup and when the memory card is inserted. If the dirty bit is set, the media player scans the media files on the memory card, updates its database, then clears the dirty bit. If the dirty bit is not set, the media player does not scan the memory card. The dirty bit is associated in the internal memory with an identifier for the memory card, allowing the use of multiple memory cards.

BRIEF DESCRIPTION OF THE DRAWINGS

FIG. 1 is a schematic drawing of the components of the present invention.

FIG. 2 is a flow chart showing the method used by the present invention to determine when to scan the content of an external memory card.

FIG. 3 is a flow chart showing the method used by the present invention to set a dirty bit on a media player.

FIG. 4 is a flow chart showing four triggering events for re-scanning an external memory card.

DETAILED DESCRIPTION OF THE INVENTION

Recognition of Problem and the Solution

In media players that create their internal database by scanning the media files on their memory, the player is not usable until this scanning is complete. In addition, changes to the media files stored on the media player memory will not be recognized unless the media player rescans the file structure of the memory. All prior art media players that use external memory require that the external memory be rescanned on start up. This is because of the fact that when a media player boots up it has no easy way to detect if the user has added additional material on the memory card. Consequently, prior art devices re-scan the external memory card every start up to ensure that the internal database matches the media files presently available in memory. Since the media player is not usable during this scanning process, these media players cause user frustration since the user must wait for the scanning process to complete before using the player.

The solution to this dilemma lies in recognizing that most users add content to their media player using a single software program running on a single personal computer. Since many media software programs can handle multiple types of media content, users rarely need to turn to auxiliary programs to load media on the player. Consequently, even media players that are capable and are designed to create their own internal database by scanning their media files can improve their efficiency through the present invention.

Media Player of the Present Invention

The invention speeds up the boot process of a media player device by giving several techniques to remove the need to scan an external memory card every time the device boots.

The first embodiment is an automatic method used to determine whether the media player needs to scan its external memory.

The elements used by the present invention are shown in FIG. 1. As seen in this figure, a media player 100 is connected to an external memory 200 and a personal computer 300. The media player 100 has a processor 110 and internal memory 120. The internal memory 120 is persistent memory, and may take a variety of forms including a hard disk or flash memory. The internal memory 120 stores operating logic 130, media files 140, an internal database 150, and status information 160. The status information 160 contains information on a variety of external memory cards 200. This information is shown in FIG. 1 as a table 160 that contains both an ID field 162 and a dirty bit field 164, although the information 160 would not have to be stored as a logical table. All that is necessary is that the information 160 is able to link a dirty bit 164 or other flag value with a particular external memory card identifier 162. The media player 100 also has user interface components 170 in order to allow the user to control the player 100 and receive information about the media files stored on the player 100. The media player 100 will usually contain volatile memory 180 as well, onto which the operating logic 130, media files 140, or internal database 150 may be loaded to increase the performance of the media player 100.

The external memory card 200 contains media files 210 and an identifier 220 that is related to or identical to the ID information 162 stored in internal memory 120. The external memory 200 is connected to the media player 100 through an interface 400 appropriate for the format of the external memory card 200. For example, if memory card 200 has a microSD card format, the interface 400 would take the form of a microSD slot on the media player 100. Alternative formats would include miniSD, standard SD (or Secure Digital), Compact Flash, Memory Stick, MMC, xD-Picture, or Smart-Media. Other formats would also be within the scope of the present invention The personal computer 300 contains a processor 310, persistent memory 320, volatile memory 330, and user interface elements 340. The computer is connected to the media player 100 via interface 500. Currently, the most likely interface 500 between a media player 100 and a personal computer 300 is a USB cable. Numerous other interfaces 500 are possible, including FireWire (or IEEE 1394), Bluetooth, and Wi-Fi (using one of the IEEE 802.11 specifications). The persistent memory 320 may take the form of a hard disk or flash memory, and is used to store data and programs, including operating system logic 350, a media manager software program 360, and media files 370. Each of these digital files 350-370 is stored in persistent memory 320 but is loaded into volatile memory 330 when actually used. The media manager software program 360 is designed to communicate with the media player 100, and to handle the loading of media files 370 on the internal memory 120 of the media player 100 and the external memory card 200.

The first embodiment or mode of the present invention works by using the dirty bit 164 in internal memory 120 on the player 100 to signify the state of the external memory card 200. In the preferred embodiment, the dirty bit 164 is tied to the identifier code 220 of the external memory device 200 by associating that identifier code 220 with the dirty bit information 164. As shown in FIG. 1, this can be accomplished by placing the ID 220 in the status information 160 as a column 162 in a table. By tracking the identifiers 220 of the external memory card 200, the media player 100 of the present invention is able to function with multiple memory cards 200.

The method that uses these elements is set forth in the flow chart 600 of FIG. 2. The media player checks the dirty bit information 164 on two occasions: the insertion of the card 200 in the media player 100 when the player 100 is turned on, and upon power-up of the player 100. At these times, the player 100 first confirms the presence of the external memory card 200 (step 610) and reads the identifier 220 from the card 200 (step 620). If the ID 220 matches one of the IDs 162 stored in the status information table 160 (step 630), the media player 100 checks the dirty bit information 164 for that identifier 162 (step 640). If the dirty bit 164 is set (for example, is set to "1"), the media player then knows that the external memory card 200 has been changed since it was last scanned. This means that the internal database 150 maintained by the media player 100 is out of date. Consequently, at step 650, the media player 100 initiates a scan of the memory card 200 and adds metadata relating to the new or changed content 210 to internal database 150. At the end of the scan, the media player 100 will clear the dirty bit 164 associated with that external memory card 200 (step 660), such as by setting the bit value 164 to "0." The next time the media player 100 boots up with that particular external memory card 200 installed, the player 100 will not re-scan the external memory 200 as the dirty bit 164 is clear.

When the media player 100 checks the status information 160 for the dirty bit 164 of a particular memory card 200, it is possible that the identifier 220 for that card 200 is not found in table 160 during step 630. This indicates that information about the media files 210 in the memory card 200 is not found in the internal database 150. Consequently, the media player 100 will scan the media files 210 on memory card 200 and update the database 150 (step 670). It will then add that identifier 162 to the table 160 and clear the dirty bit field 164 for that identifier 162 (step 680).

The only way the dirty bit will get set is when the user adds or removes content through the media manager software program 360 running on the personal computer 300. This is seen in the flowchart 700 of FIG. 3. When a user updates the media player 100 using the media manager software application 360 (step 710), the application 360 will know whether changes have been made to the media files 210 stored on the external memory card 200. When changes do occur (determined at step 720), the media manager application 360 sets the dirty bit 164 associated with the identifier 220 for that external memory card 200 (step 730). If there is no entry in the status information table 160 for that identifier 220, a new row is added for that memory card 200 with the dirty bit field 164 set. Consequently, the next time the media player 100 reboots with that memory card 200 in the slot 400, the dirty bit field 164 will indicate the need to rescan the media files 210 on the card 200.

The present invention implements an end-to-end solution for the problem of frustrated users enduring unnecessary scanning of external memory cards 200. To accomplish this advantage, the present invention assumes that the user will primarily change the media files 210 on an external memory card 200 using a media manager software program 360 capable of setting the dirty bit field 164 in status information table 160. However, it is clear that there are some circumstances that will cause the media files 210 on a card 200 to change without the media player's dirty bit field 164 being set. For example, a user may choose to use the player 100 as a hard drive and change the media files 210 without the involvement of the media manager application 360. Alternatively, a single media card 200 may be used with multiple media players 100. In this circumstance, the media manager software program 360 may update the media files 210 on an external memory card 200 and properly set the dirty bit 164 on the media player 100 presently connected to the memory card 200. When the card 200 is removed from that player 100 and inserted into the second player, no change would have been made to the dirty bit field 164 on the second player.

Because of these circumstances, it is necessary to provide a way in which the user can control when the media player 100 will re-scan a memory card 200. FIG. 4 shows a variety of contemplated ways to cause a player 100 to rescan a memory card 200 (shown as step 780 in FIG. 4). The first mode is the automatic mode 600 described above, where the determination as to whether a memory card 200 will be scanned is based upon an examination of the dirty bit information 164 with the possibility of manually requesting a rescan. Three other rescan modes are possible, each of which might be considered manual scanning modes.

In the first manual mode 750, the external memory card 200 is always rescanned on start-up unless the user provides input that the rescan should be skipped. For example, if a user wishes to skip the scan at restart, the user would hold down a user control (such one of the buttons 172) on power-up of the device. This tells the media player 100 to skip the rescan function. If the user doesn't hold down the user control on power-up, the device will re-scan the memory card.

In the second manual mode 760, the rescan function will only be performed when the user provides input that the rescan should be initiated. For example, if the user does not hold the appropriate button 172 down during power-up, the external memory card 200 is not scanned. If the button 172 is pressed during power-up, the memory card 200 is scanned and the internal database 150 is updated. Alternatively, there can be a setting in the user interface 170 that allows the user to instruct the player 100 to rescan the external memory card 200 (process 780).

The final manual mode 770 provides that the media player 100 never scans external memory cards 200 at power-up. However, once the media player 100 is powered up, if a user inserts an external memory card 200 during operation of the media player 100, the memory card 200 is automatically scanned. The next time the user reboots the media player 100 it will not scan the external memory card 200 as scanning only occurs on insertion when the media player 100 is fully operational.

A separate embodiment of the present invention removes the status information 160 from the media player 100. Instead, in this embodiment the dirty bit information 164 is stored directly on the external memory card 200. In this case, the dirty bit information 164 must be associated with a particular media player 100, for each memory card 200 may be used with multiple media players 100. This can be accomplished using a status information table similar to that shown as table 160 in FIG. 1, except the table is stored in media card 200 and the ID information is the identifier of a particular media player 100 as opposed to the identifier for a particular memory card 200.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A media player comprising:
   a) a processor capable of executing programming logic;
   b) a memory card interface adapted to receive an external memory card that contains media files and an external memory card identifier;
   c) non-transitory storage medium containing
      i) an internal database of media file metadata, and
      ii) status information associating a flag value with the external memory card identifier;
   d) programming logic to cause the processor to scan the media files on the external memory card to update the internal database, wherein the processor determines whether to scan the media files on the external memory card in part by evaluating the flag value associated with the identifier for the external memory card;
   wherein the flag value associated with the external memory card identifier is set to a particular value when the media files on the external memory card are altered.

2. The media player of claim 1, wherein the media files on the external memory card are altered by a personal computer separate from the media player.

3. The media player of claim 2, wherein the personal computer sets the flag value to the particular value.

4. The media player of claim 1, wherein the processor in the media player sets the flag value to the particular value.

5. The media player of claim 1, wherein the flag value associated with the external memory card is cleared after the processor scans the media files on the external memory card.

6. The media player of claim 1, wherein the programming logic causes the processor to determine whether to scan the media files on the external memory card at start-up of the media player.

7. The media player of claim 6, wherein the programming logic further causes the processor to determine whether to scan the media files on the external memory card when the external memory card is inserted into the memory card interface.

8. The media player of claim 1, wherein the status information associates flag values with a plurality of additional external memory cards, thereby allowing the media player to determine whether to scan a particular one of the plurality of additional external memory cards in part by evaluating the flag value associated with an identifier for the particular external memory card.

9. A system that maintains media file metadata comprising:
   a) an external memory card containing media files;
   b) a media player having
      i) a media card interface adapted to receive and read the external memory card, and
      ii) an internal database of media file metadata; and
   c) a flag value associated with the combination of the external memory card and the media player, the flag value indicating whether the media file metadata in the internal database on the media player reflects a current state of the media files on the external memory card, the flag value being one of
      i) a first value indicating that the media file metadata in the internal database on the media player reflects a current state of the media files on the external memory card, and
      ii) a second value indicating that the media file metadata in the internal database on the media player does not reflect a current state of the media files on the external memory card
   wherein the flag value is stored on the external memory card along with an identifier for the media player.

10. The system of claim 9, wherein the flag value is stored on the media player along with an identifier for the external memory card.

11. The system of claim 10, further comprising additional memory cards each containing media files and a unique identifier, further wherein the media player contains flag values associated with the unique identifiers of the additional memory cards indicating whether the metadata in the internal database reflects a current state of the media files on the associated external memory card.

12. The system of claim 9, wherein the media player further comprises programming logic for updating the internal database with the metadata for the media files on the external memory card and subsequently setting the flag value associated with the combination of the external memory card and the media player to the first value.

13. The system of claim 9, further comprising:
   d) a media manager software program operating on a personal computer in data connection with the media player, the media manager software programming altering the media files on the external memory card and setting the flag value to the second value indicating that the media file metadata in the internal database on the media player does not reflect the current state of the media files on the external memory card.

14. A method of determining whether to scan an external memory card in a media player comprising:
   a) having a processor on the media player read a status indicator associated with the external memory card that indicates whether metadata in an internal database on the media player reflects a current state of media files found on the external memory card;
   b) if the status indicator reflects that the metadata in the internal database is not current,
      i) scanning the media files in the external memory card to update the metadata stored on the internal database, and
      ii) clearing the status indicator.

15. The method of claim 14, wherein the processor reads the status indicator from memory on the media player, and wherein the status indicator is associated with the external memory card through an identifier.

16. The method of claim 14, wherein the processor reads the status indicator from the external memory card.

17. The method of claim 16, wherein the status indicator found on the external memory card is associated with the media player through an identifier.

18. The method of claim 14, further comprising:
   c) when updating the media files on the external memory card, setting the status indicator to reflect that the metadata in the internal database is not current.

19. The method of claim 14, further comprising:
   c) having a processor on a personal computer execute a media manager software program to update the media files on the external memory card and set the status indicator to indicate that the metadata in the internal database does not reflect the current state of media files found on the external memory card.

* * * * *